US008326295B2

(12) United States Patent
Bobier

(10) Patent No.: US 8,326,295 B2
(45) Date of Patent: Dec. 4, 2012

(54) SELF ORGANIZING CELLULAR NETWORKS

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 10 days.

(21) Appl. No.: 13/210,452

(22) Filed: Aug. 16, 2011

(65) Prior Publication Data

US 2012/0069773 A1    Mar. 22, 2012

Related U.S. Application Data

(60) Provisional application No. 61/403,831, filed on Sep. 22, 2010.

(51) Int. Cl.
*H04W 4/00* (2009.01)

(52) U.S. Cl. ........ 455/434; 455/446; 455/450; 455/451; 455/452.1; 455/453; 370/310; 370/328; 370/329

(58) Field of Classification Search ................. 455/434, 455/446, 450, 451, 452.1, 453, 403; 370/310, 370/328, 329, 338
See application file for complete search history.

(56) References Cited

U.S. PATENT DOCUMENTS

| | | | | |
|---|---|---|---|---|
| 5,974,324 | A | * | 10/1999 | Henson .......................... 455/447 |
| 6,002,935 | A | * | 12/1999 | Wang ............................ 455/447 |
| 6,477,155 | B1 | | 11/2002 | You |
| 6,615,040 | B1 | | 9/2003 | Benveniste |
| 2003/0195016 | A1 | * | 10/2003 | Periyalwar ................. 455/562.1 |
| 2010/0296477 | A1 | * | 11/2010 | Hason et al. .................. 370/330 |

* cited by examiner

*Primary Examiner* — Kathy Wang-Hurst
(74) *Attorney, Agent, or Firm* — Dennis L. Cook, Esq.

(57) ABSTRACT

This invention addresses a method of scanning and self organization that is programmed into the base station which then will automatically avoid mutual interference and move the use of radio channels from one base station to another to move network capacity to where it is needed through a process called "abandonment".

3 Claims, 1 Drawing Sheet

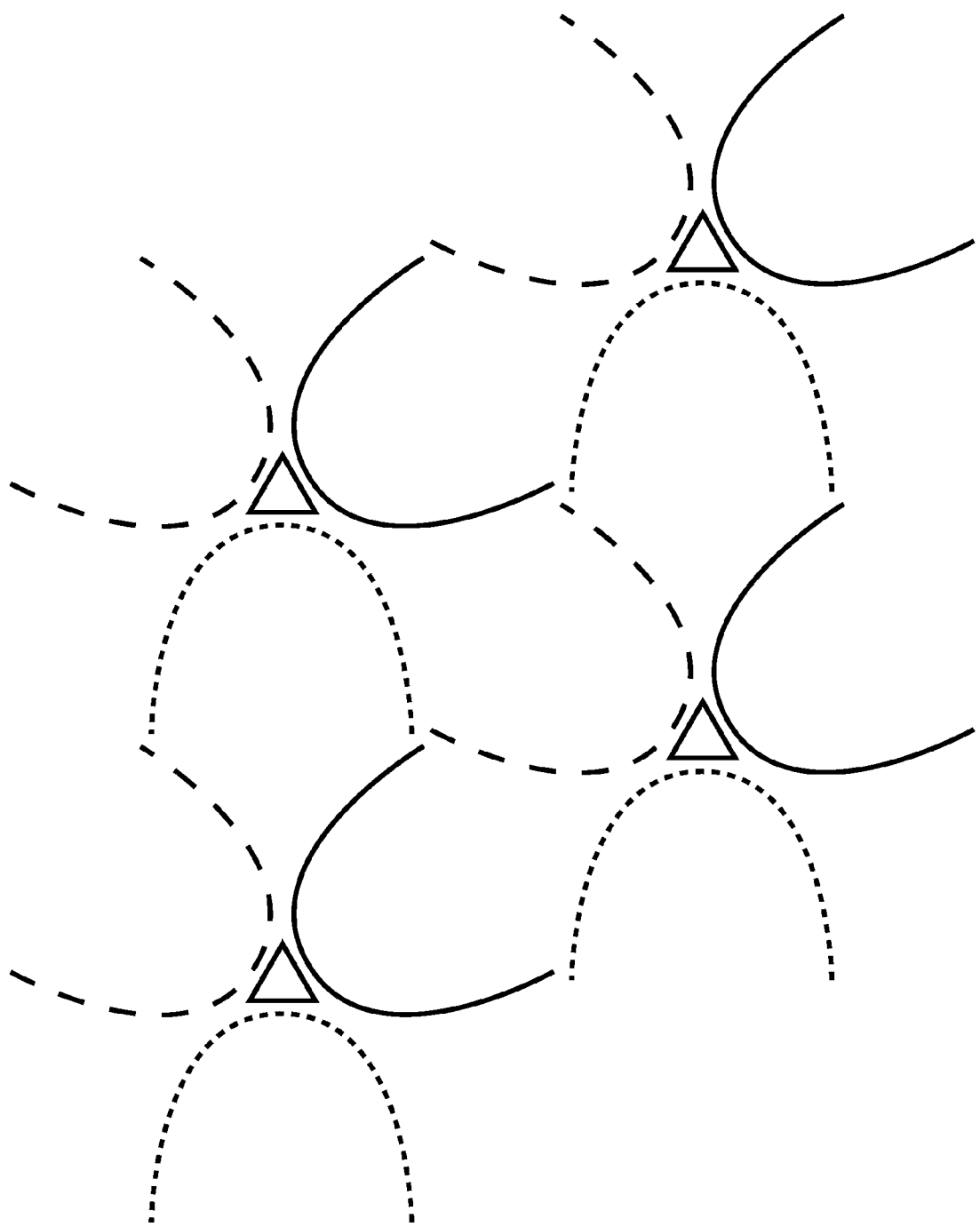

SELF ORGANIZING CELLULAR NETWORKS

CROSS-REFERENCE TO RELATED APPLICATION

The present application claims the benefit of previously filed Provisional Patent Application Ser. No. 61/403,831 filed Sep. 22, 2010.

FIELD OF THE INVENTION

This invention addresses a method of scanning and self organization that is programmed into the base station which then will automatically avoid mutual interference and move the use of radio channels from one base station to another to move network capacity to where it is needed through a process called "abandonment".

BACKGROUND OF THE INVENTION

Cellular radio networks now proliferate much of the world. Constructing these networks requires the careful work of cellular network engineers. To construct a cellular network, one must consider many variables, not the least of which is the use and re-use of radio frequencies or channels. Cellular base stations make use of several radio channels, which are usually grouped and subdivided into one or more sectors. For instance suppose that a cellular network has available to it 18 radio channels. Further suppose that the base station is expected to provide 360 degree radio coverage. Most cellular systems today transmit and receive in three sectors or directions. It follows then that each sector would have at least one antenna that is able to transmit and receive over a 120 degree arc to the horizon. At least one such antenna is directed to one sector of the coverage area and the antennas are arranged in a triangular pattern to affect full 360 degree coverage. Amongst these three antennas, the various radio channels are assigned so that each antenna has one or more distinct radio frequencies that won't interfere with the channels in use at the other two antennas. Thus a cellular base station typically incorporates three antenna systems, oriented 120 degrees apart, each with one or more unique radio frequencies or channels.

A cellular network then consists of many such cellular base stations. Cells, which are adjacent to each other, must be careful not to cause interference with each other. Interference can be caused when antennas receive or transmit radio frequencies that are used by other adjacent cells, causing radio interference. To avoid this overlap or duplication of frequencies by adjacent or nearby cells, radio network engineers use a variety of engineering practices, computer simulations and field testing. One technique used is known as frequency re-use planning, which in essence limits the number of frequencies used by any one base station to a subset of the total inventory of frequencies, thus assuring that adjacent cells always have frequencies available that aren't used by other adjacent cells. This practice limits the total number of frequencies, and thus the total radio bandwidth per cell, to some fraction of the available bandwidth. Strict adherence to such plans is often a part of the network design process, but imparts an added cost to the network because valuable radio channels aren't used when on many occasions they could be.

An ideal network always exists on paper, but never in practice. The first problem to be encountered is the location of the cell itself. While on a flat featureless plain, absent of cell placement restrictions, local zoning, and any of a myriad of legal and physical restrictions, a perfect location could be found for any cell location. Reality dictates that cells go where they can be put. This results in a less than uniform cellular placement. Thus, frequency re-use, transmitter power levels and antenna vertical tilt all become variables in the actual construction of the network on a cell-by-cell basis.

Once the cell is built, an engineering team must "drive test" the area to verify the cell coverage area. Once many cells are constructed, more drive testing must be done to evaluate the overall performance of the network and correct any un-desired interference.

BRIEF SUMMARY OF THE INVENTION

The invention disclosed in this application is an improvement to this lengthy process that will greatly simplify and speed network engineering, while saving much of the considerable cost of such engineering exercises. It is an improved cellular base station that is capable of "self organization" into a radio network so that much of the above outlined engineering effort is eliminated.

By way of example, the BSN-250 base station and cellular network developed by xG Technology, Inc. consists of a digital controller, RF unit and three sector/combiner units. The digital controller provides external interface to the Internet, and radio air interface. The radio unit provides transmit RF amplifiers and receiver front-ends. The sector/combiner units divide the 18 radio channels into three sectors and combine 6 channels each into one antenna port for connection to a single sector antenna. Thus 18 radio channels are sub-divided into three sectors for use as described above.

For a fuller understanding of the nature and objects of the invention, reference should be made to the following detailed description taken in connection with the accompanying drawing.

DESCRIPTION OF THE DRAWINGS

For a fuller understanding of the nature and objects of the invention, reference should be made to the accompanying drawing, in which:

FIG. 1 is a diagram showing the three sector cellular configuration of a typical cellular network.

DETAILED DESCRIPTION OF THE INVENTION

By way of example, the invention disclosed in this application is applied to a method of air interface design developed by xG Technology, Inc. and is now known by its commercial designation, xMax. The current architecture for a commercial xMax network is a cellular model. It's the familiar three sector, geodesic deployment in which each sector broadcasts signals to $\frac{1}{3}^{rd}$ of the 360 degree arc. Cells are positioned, ideally, so that sectors provide multiple re-enforcing signals from multiple directions to any given potential user location. Thus, channels are available to be received regardless of nearby shadowing.

In the xMax system, each sector can transmit and receive on 6 of up to 18 available channels. xMax is a TDMA system (Time Division Multiple Access). The channel allocation is pre-engineered for each sector. For instance solid line sectors might use channels 0,3,6,9,12 and 15 while dashed sectors use channels 1,4,7,10,13 and 16 and dotted sectors use 2,5,8, 11,14 and 17 as shown in FIG. 1.

xG Technology's cellular networks are constructed much the same way as any other cellular network. An object of this invention is an improvement to the cellular base station.

While base stations for different services may have more or fewer channels than the BSN-250, the network engineering always follows the same basic process. Another object of this invention is to eliminate much of the network planning by giving the base station the ability to become self aware of other cell channels in use in the environment.

The process is as follows:
a. The newly installed cell would be turned on.
b. The cell would scan the assigned radio band on one sector, identifying the channel frequencies that are vacant.
c. Up to six vacant channels would be identified and assigned to the first sector.
d. The process repeats for each of the two remaining sectors.

Thus up to 18 channels have been scanned and verified as un-used and assigned across three sectors.

As convenient as it would be to have every base station fully self configuring to only use radio channels that can't be detected as in-use by other cells, there are situations where manual control might be important. For instance suppose one only needs a limited amount of radio network capacity near one cell, but more near another cell. A user interface would be available to disable the use of certain channels.

A further improvement would involve the incorporation of channel abandonment. As mentioned above, one doesn't always have access to the perfect location for cell placement. In some cases cells might be very close together. Some channels might not be available to a base station because they are in use by a nearby cell. To that end the user interface allows the engineer to further categorize a particular channel in one of three ways.
i. Do not use
ii. Share
iii. Dominate When the channel is flagged as "Do not use", the channel is simply not used. When it's marked as "Share", the base station will scan and claim channels as described above. However the channel can be abandoned if light loading or usage doesn't require the added capacity. A channel which is marked as "dominate" will not be abandoned, even if the base station doesn't need the capacity.

Base stations that are not experiencing heavy loading can unilaterally disable certain channels so that adjacent base stations that do experience heavy loading can enable more channels. Any channel transceiver that is not assigned or used by a base station should remain in the scanning mode. If a channel suddenly becomes vacant, the base station should assume that there has been a voluntary abandonment of the channel and claim it to support the heavy load if one exists. Thus base stations would share overlapping channels to move capacity where it is needed. Also a channel can be automatically abandoned if interference is detected. Interference can be from other base stations, from other un-related systems, or even consumer devices. Being able to detect and avoid interference in favor of another less noisy channel is crucial for use in un-licensed radio bands.

Since certain changes may be made in the above described system and method for self organizing cellular networks without departing from the scope of the invention herein involved, it is intended that all matter contained in the description thereof or shown in the accompanying figure shall be interpreted as illustrative and not in a limiting sense.

What is claimed is:

1. A method for automatically organizing an interference avoiding radio frequency network of multiple base stations each capable of transmitting and receiving all channels of a radio frequency band and also having one or more sectors with each sector capable of transmitting and receiving multiple channels comprising:

turning on one base station of said multiple base stations;
then said base station scanning all channels with one sector of said one or more sectors;
then said base station categorizing some or all of said channels as do not use, share, or dominate wherein the do not use categorized channels are disabled, the share categorized channels are scanned, identified, and assigned if available, and the dominate categorized channels are never disabled;
then said base station identifying all available channels in said one sector that are not being used by another base station of said multiple base stations;
then said base station assigning available unused channels to said sector of said base station wherein the maximum number of available unused channels to assign is determined by dividing the number of channels of a radio frequency band capable of being transmitted and received by said base station by the number of said one or more sectors on said base station; and,
said base station then repeating the scanning, categorizing, identifying, and assigning of unused channels in each of the other sectors of said one or more sectors.

2. The method of claim 1 including disabling some or all unused channels.

3. The method of claim 2 including automatically disabling a channel if interference in said channel is detected by said base station.

* * * * *